United States Patent Office 3,418,229
Patented Dec. 24, 1968

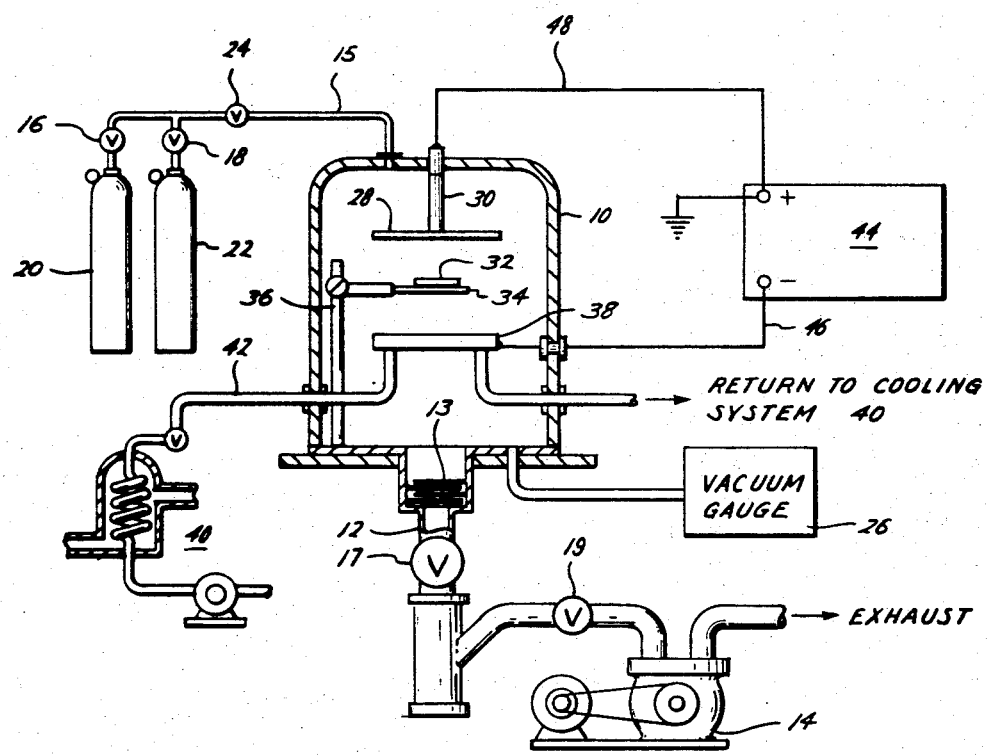

3,418,229
METHOD OF FORMING FILMS OF COMPOUNDS HAVING AT LEAST TWO ANIONS BY CATHODE SPUTTERING
Tavorath K. Lakshmanan, Matawan, and Joseph M. Mitchell, Fayson Lakes, N.J., assignors, by mesne assignments, to Weston Instruments, Inc., Newark, N.J., a corporation of Delaware
Filed June 30, 1965, Ser. No. 468,270
1 Claim. (Cl. 204—192)

ABSTRACT OF THE DISCLOSURE

A method of preparing films of compounds having widely varying properties by reactively sputtering a compound in an ionized gas containing an ion which combines with the compound as a second anion. The properties are controlled by varying the percentage of the reactive gas.

---

This invention relates to thin films of materials and, more particularly, to a method of forming thin films having predetermined physical and/or electrical properties. The method of this invention facilitates, for example, the production of films that are electrically conductive, semi-conductive or non-conductive.

Thin films of various materials find many uses. For example, because of their high refractive index, titanium dioxide films are widely employed in the optical field for increasing or decreasing the reflectance of optical parts, for establishing multi-layer interference coatings, and for making filters of narrow bandwidth in the visible and infrared regions of the spectrum. Titanium dioxide films are also used to make resistors and the dielectric material of linear and non-linear capacitors. Recent applications of thin films also include microcircuits and microcircuit components such as resistors, capacitors and transistors.

Various techniques have been tried in an effort to increase the number of available dielectric materials which can be deposited in thin film form. Many inorganic metallic compounds, such as fluorides, sulfides and chlorides, can be vacuum-evaporated into films for use in optical interferometers, multilayers filters, and anti-reflection coatings. For many uses, however, the materials which can be vacuum-evaporated, e.g., zinc sulfide or lead chloride, are generally characterized by a relatively low electrical resistance and, in addition, become subject to various chemical reactions, especially in humid atmospheres. Other more suitable materials or techniques must therefore be made available to the art of forming thin films.

Some metal oxides, e.g., those of titanium, bismuth, tin, etc., avoid the above defects and have the further advantage of becoming highly adherent to glass surfaces. Unfortunately, however, the production of metal oxide films by vacuum evaporation techniques is severely limited by chemical reactions occurring at high temperatures between the metal oxide and the heater material. These reactions often lead to a reduction of the evaporant to a lower oxide, or to a free metal. Also the oxygen pressure which can be permitted during evaporation may be lower than that required for the stable existence of some oxides. For example, titanium dioxide decomposes and forms a lower black oxide when heated in vacuo.

A number of other methods are known in the prior art for preparing metal oxide films in their highest state of oxidation. Unfortunately, each of these prior methods has certain attendant disadvantages. One of these prior art methods consists of evaporating the metal from a platinum heater to prevent the decomposition of its oxide caused by the metal's support. This technique is of questionable value since the evaporation temperature of most metal oxides is near to or above the melting point of platinum. Another of the prior art techniques slowly evaporates a volatile lower oxide so that the condensed film is free to absorb oxygen from the residual atmosphere during its growth. Films formed by such techniques often never completely attain the highest state of oxidation. Still another of the prior art methods oxidizes the metallic film by heating it in air. This method has the limitation that when the film is to be used, for example for optical purposes, its glass support must tolerate being raised to a temperature of 300–400° C. Using a fourth technique, the oxide film is deposited from a vapor cloud produced by a chemical reaction between a metal halide and water vapor. This process can be used for preparing transparent conducting tin oxide films on glass, for example. Unfortunately, using this process the control of the film deposition rate is rather difficult to attain and a suitable exhaust system must be provided for removing the reaction products.

Reactive sputtering techniques have also been used to form thin films without many of the attendant disadvantages of the vacuum evaporation techniques. Reactive sputtering occurs when a glow discharge is maintained between anode and cathode elements in a residual atmosphere of a chemically active gas. The sputtered deposits of the chemically active elements are combined with the active gas. It is possible using reactive sputtering, for example, to prepare optically non-absorbing metal oxide deposits to specified film thicknesses. Further, many films which could be neither evaporated nor prepared by heat oxidation methods can be readily prepared by reactive sputtering techniques and then used to form optical coatings or microcircuit components.

The physical process of reactive or cathodic sputtering is not yet entirely understood. Insofar as it is understood, it may be said that the ions of the gas atmosphere impact upon the cathode under the influence of the direct-current potential applied between the anode and cathode elements. This ionic bombardment extracts from the cathode particles which are attracted by the anode. Either the anode or another support member within the path of the particles is then progressively coated with a layer of such particles which become converted into corresponding particles of an oxide, sulfide, hydride, etc., dependent upon the reactive gas employed. This chemical conversion or oxidation occurs either during the bombardment of the cathode by the oxygen molecules or ions, or by oxygen absorption by the sputtered metal atoms during transit due to collisions between the gas molecules and the metal atoms, or by the absorption of oxygen molecules when impinging upon the deposited film.

Although reactive sputtering techniques have been used to great advantage, the films thereby formed have been limited to only single metallic compounds. As a result, the number of variations that may be made in the physical and electrical characteristics of thin films is undesirably limited. Also films obtained by prior art sputtering techniques lacked in stability. For example, if, in accordance with prior art techniques, the films are doped after their formation, they generally do not possess the desired uniformity.

Much work has been done recently to vary the stoichiometry of, and also to introduce impurities into, various materials for the purpose of predetermining the films' physical and electrical characteristics.

In accordance with a method disclosed in a co-pending abandoned application, Ser. No. 271,989 and assigned to the same assignee, alloy films may be formed by first preparing an alloy material of the desired composition by any known technique. A cathode is then made from the alloy material. The cathode is positioned in a sputtering chamber adjacent to a suitable base member upon which the film is to be deposited. The chamber is evacuated and a mixture of an inert gas and of a gas that is chemically reactive with the elements of the alloy material is introduced into the chamber. A direct current potential is applied to an anode, located adjacent to the base member, and the elements of the alloy material become sputtered in the presence of the chemically reactive gas. During the sputtering process, the elements of the alloy material and of the chemically reactive gas combine chemically and a thin film of relatively uniform homogeneous composition becomes deposited on the base member. By varying the ratio between the elements in the alloy material or the proportion of the reactive gas to the inert gas, the physical and/or electrical characteristics of a relatively large number of thin films may be controlled.

In accordance with the method of the present invention, improved compound films may be formed by first preparing a compound material of the desired composition and impurity. The compound material is then used to make a cathode which is positioned in a sputtering chamber adjacent to a base member. The chamber is evacuated and, preferably, a mixture of an inert gas and of a gas that is chemically reactive with the elements of the compound is introduced into the chamber. A direct curent potential is applied to an anode also located adjacent to the cathode. The elements of the compound material then become sputtered in the presence of the chemically reactive gas. During the sputtering process, the elements of the compound material and of the chemically reactive gas combine chemically and a thin film of a relatively uniform homogeneous composition becomes deposited on a base member positioned adjacent to the cathode.

In accordance with the present invention, the chemical reaction which takes place between the reactive gas and the compounds leads to films of mixed compounds with more than one anion, such as, for example, cadmium sulpho-selenide. Mixed compounds with more than one anion are extremely important to the development of new components. Moreover, by varying the proportions of the reactive gas, such as hydrogen sulfide, the proportions of the anions, such as sulfide and selenide can be controlled in the resulting film. One great advantage of the present method is that it allows the fabrication of films of widely varying properties, such as forbidden energy gap, carrier mobility, electrical conductivity and optical absorption. Furthermore, these properties can be controlled at will by varying the proportion of the reactive gas and the composition of the sintered compound layer forming the cathode. Another advantage of the present method lies in the fact that the stoichiometry of the film material can be controlled even without the use of reactive gases. For example, the cathode may be made of a sintered layer of sulpho-selenide and nonreactive sputtering is done from this material to form a sulpho-selenide film.

It is, therefore, an object of this invention to provide an improved method of forming stable films of materials having a wide range of selectively controllable characteristics.

Another object of this invention is to provide a method for making a wide range of thin films from compounds.

In accordance with the method of this invention, improved compound films may be formed by first preparing a compound material of the desired composition and impurity in accordance with known techniques. The compound material is then used as an electrode in a sputtering chamber in which is also housed a suitable base member upon which the film is to be deposited. The chamber is then evacuated and an inert gas or a mixture of an inert gas and of a gas that is chemically reactive with the elements of the compound is introduced into the chamber. A direct current potential is applied to an anode located adjacent to the base member and the cathode such that the elements of the compound material are sputtered in the presence of the gas. During the sputtering process, the elements of the compound material and of the gas combine chemically to form a thin film of relatively uniform homogeneous composition on the base member. By varying the impurities and the proportions of the elements in the compound and/or the proportions of the reactive gas to the inert gas, the physical and/or the electrical characteristics of a wide range of thin films may be controlled. For further objects and advantages of this invention, reference may be had to the following detailed description taken in conjunction with the accompanying schematic drawings in which the sole figure shows a preferred apparatus for carrying out the improved method of this invention.

Referring now to the drawing, the apparatus includes an airtight chamber 10 having a connection 12 through a suitable baffle 13, in the bottom of the chamber 10, to vacuum pumps 14, and a connection 15, at the top of the chamber 10, for receiving a mixture of gases. The chamber 10 may be of glass, metal or other suitable material.

Air is first exhausted from the chamber 10. Next, the gas mixture is introduced into the chamber 10 through the connection 15. The gas mixture includes an inert gas from a supply tank 20, such as argon, helium, or any of the higher atomic number inert gases, and of a chemically reactive gas from the supply tank 22, such as oxygen, hydrogen, hydrogen sulfide $H_2S$, phosphine $PH_3$, arsine $AsH_3$ or water vapor. The particular chemically reactive gas employed depends upon the film desired, i.e., an oxide, a sulfide or other chemical compound.

The relative proportions of the two gases in the gas mixture may be varied by adjustment of valves 16, 18 on the respective gas tanks 20 and 22. In like manner the pressure of the gas mixture can be adjusted by means of an inlet needle valve 24 in the connection 15. The degree of evacuation can be measured by a suitable vacuum gauge 26. The optimum pressure or vacuum depends on the substances used and is best determined in each case by experimentation. Additional valves 17 and 19 in the lines to the vacuum pumps 14 facilitate the control of the degree of evacuation.

A plate 28, supported in the upper portion of the chamber 10 by an insulated, electrically conductive stem 30, forms the anode. A suitable substrate or base member 32 on which the film is to be deposited is placed on a mounting plate 34. An electrically insulated support member 36 slidably carries the mounting plate 34 whereby the mounting plate can be variously positioned relative to the anode 28.

A cathode 38, conveniently in the form of a disc, is made of the desired compound material. A preferred method for forming the cathode will subsequently be described. A suitable cathode cooling system 40 circulates a cooling agent, such as water, through tubing 42 to cool the cathode 38.

To carry out the reactive sputtering process, a direct-current potential, typically on the order of 2000 volts, is supplied by a high voltage power source 44 to conductors 46 and 48, respectively connected to the cathode 38 and the anode 28.

Using the method of the invention, the cathode 38, which is made of the desired compound, is placed in the vacuum chamber 10. Then the negative terminal of the high voltage power supply 44 is connected to cathode 38.

In the said copending application, the alloy cathode is made using standard metallurgical techniques. Typical alloys are nickel-chromium and cadmium-copper. The fabrication of compound materials on the other hand is entirely different. Examples of compounds are cadmium sulphide and zinc sulphide. The production of compounds consists of semiconductor sintering and doping techniques falling in the broad category of the new semiconductor technology. As an example, cadmium sulphide powder suspension is sprayed on an aluminum cathode plate and sintered to form a compact polycrystalline layer which is used as the cathode material (say, cadmium sulphide) which is doped with the desired impurities (such as copper and chlorine) using semiconductor technology similar to that used in the manufacture of the new photoconductive and electroluminescent devices. In the presence of a chemically reactive gas, films of mixed compounds with more than one anion (for example, cadmium sulphoselenide) or with more than one cation are formed. Compounds with more than one anion are extremely important in the new electronic components field. By varying the proportions of the reactive gas (such as hydrogen sulphide), the proportions of the anions (such as sulphide and selenide) can be controlled in the resulting film. The physical and chemical properties of the compound films can be controlled at will by varying the proportion of the reactive gas and the composition of the sintered compound layer forming the cathode. While in the method disclosed in said copending application, the stoichiometry of the film material is controlled by varying the proportion of the reactive gases, in the present method, mixed compounds (with more than one anion or cation) can be prepared even without the use of reactive gases. For example, when the cathode is made of a sintered layer of sulpho-selenide and nonreactive sputtering is done from this material, a sulpho-selenide film is formed. As another example, nonreactive sputtering from a sintered layer of zinc-cadmium sulphide yields a film of zinc-cadmium sulphide which is a material with more than one cation.

Even though the sputtering process in accordance with the present method is similar to that used in the method disclosed in said copending application, the present method is nevertheless quite different from, and much more powerful than, the method disclosed in said copending application. The cathode materials, their fabrication and the resulting film materials are very different and a wide variety of electronic materials with photoconductive, electroluminescent, photovoltaic, rectifying, dielectric and transistor properties can be prepared in the form of thin films using the method of the present invention. A preferred method for preparing the cathode material is given hereinafter. The desired compound material is prepared in the form of a powder by grinding crystals or by using a wet chemical process. Powder of a desired particle size distribution is taken and mixed with activator salts in solution to form a slurry. This slurry is dried and baked in a furnace at about 800° C. in order to effect the diffusion of the impurities. The activated powder is then taken, ground to desired particle size, and a suspension is prepared in a fluid such as isoamyl alcohol. This suspension is then sprayed on an aluminum base plate and sintered in a furnace at a temperature of approximately 600° C. The thickness of the sintered layer should be approximately between 0.001 and 0.005 inch. This base plate with the compound layer sintered thereon is taken and used as the cathode in the reactive sputtering process. Examples of compounds used are cadmium sulphide, zinc sulphide, cadmium selenide, zinc selenide, cadmium telluride, zinc telluride, titanium oxide, rare earth oxides and sulphides.

While we have described our invention in certain preferred embodiments, modifications and changes may be made therein and it should be understood that no limitations upon our invention are intended other than may be imposed by the scope of the appended claim.

What is claimed is:

1. A method of forming a thin film of a mixed compound with more than one anion on a substrate mounted in an air-tight sputtering chamber that includes an anode and a cathode, comprising the steps of: forming the cathode of a mixed compound selected from the group consisting of cadmium sulfide, zinc sulfide, cadmium selenide, zinc selenide, cadmium telluride, and zinc telluride which are to be included in the thin film, exhausting gas from the chamber to provide a vacuum therein, mixing a gas which is chemically nonreactive with the elements of the compound with a gas selected from the group consisting of oxygen, hydrogen, hydrogen sulfide, phosphine, arsine and water vapor, establishing the predetermined volumetric ratio of the reactive gas to nonreactive gas during the mixing thereof, introducing the resulting gaseous mixture into the evacuated chamber, applying a DC potential to the anode and cathode to cause reactive sputtering of the compound onto the substrate in the presence of the gaseous mixture so that the film contains a predetermined amount of the reactive gas as determined by the volumetric ratio of the gases comprising the gaseous mixture.

References Cited

FOREIGN PATENTS 565,153 10/1958 Canada.
830,392 3/1960 Great Britain.
895,879 5/1962 Great Britain.

ROBERT K. MIHALEK, *Primary Examiner.*

U.S. Cl. X.R.

204—164; 252—501, 518, 301.6